(12) United States Patent
Zhong et al.

(10) Patent No.: US 10,620,826 B2
(45) Date of Patent: Apr. 14, 2020

(54) OBJECT SELECTION BASED ON REGION OF INTEREST FUSION

(71) Applicant: QUALCOMM Incorporated, San Diego, CA (US)

(72) Inventors: Xin Zhong, San Diego, CA (US); Dashan Gao, San Diego, CA (US); Yu Sun, Hangzhou (CN); Yingyong Qi, San Diego, CA (US); Baozhong Zheng, San Diego, CA (US); Marc Bosch Ruiz, San Diego, CA (US); Nagendra Kamath, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 190 days.

(21) Appl. No.: 15/327,177

(22) PCT Filed: Aug. 28, 2014

(86) PCT No.: PCT/CN2014/085381
§ 371 (c)(1),
(2) Date: Jan. 18, 2017

(87) PCT Pub. No.: WO2016/029399
PCT Pub. Date: Mar. 3, 2016

(65) Prior Publication Data
US 2017/0168709 A1    Jun. 15, 2017

(51) Int. Cl.
*G06F 3/0488*    (2013.01)
*G06T 7/11*    (2017.01)
(Continued)

(52) U.S. Cl.
CPC ....... *G06F 3/04886* (2013.01); *G06K 9/2081* (2013.01); *G06K 9/3233* (2013.01);
(Continued)

(58) Field of Classification Search
CPC ........ G06F 3/04886; G06K 2009/3291; G06K 9/2081; G06K 9/3233; G06K 9/342; G06K 9/629; G06T 7/11
See application file for complete search history.

(56) References Cited

U.S. PATENT DOCUMENTS 5,732,697 A * 3/1998 Zhang ................... G06T 7/0012
600/300
8,819,591 B2    8/2014 Wang et al.
(Continued)

FOREIGN PATENT DOCUMENTS

CN    102246208 A    11/2011
CN    102682454 A    9/2012
(Continued)

OTHER PUBLICATIONS

A new seeded region growing algorithm for large object segmentationYanhui Shan ; Kunyu Tsai ; Jian Wu2011 4th International Conference on Biomedical Engineering and Informatics (BMEI)Year: 2011 , vol. 1 (Year: 2011).*
(Continued)

*Primary Examiner* — Kim Y Vu
*Assistant Examiner* — Michael J Vanchy, Jr.
(74) *Attorney, Agent, or Firm* — Moore IP

(57) ABSTRACT

A method includes receiving a user input (e.g., a one-touch user input), performing segmentation to generate multiple candidate regions of interest (ROIs) in response to the user input, and performing ROI fusion to generate a final ROI (e.g., for a computer vision application). In some cases, the segmentation may include motion-based segmentation, color-based segmentation, or a combination thereof. Further, in some cases, the ROI fusion may include intraframe (or spatial) ROI fusion, temporal ROI fusion, or a combination thereof.

29 Claims, 9 Drawing Sheets

(51) Int. Cl.
*G06K 9/34* (2006.01)
*G06K 9/20* (2006.01)
*G06K 9/32* (2006.01)
*G06K 9/62* (2006.01)

(52) U.S. Cl.
CPC ............ G06K 9/342 (2013.01); G06K 9/629 (2013.01); G06T 7/11 (2017.01); *G06K 2009/3291* (2013.01)

(56) References Cited

U.S. PATENT DOCUMENTS

| | | | |
|---|---|---|---|
| 8,861,864 B2 | 10/2014 | Hong et al. | |
| 9,329,827 B2 | 5/2016 | Lavine et al. | |
| 9,633,446 B2 | 4/2017 | Wang et al. | |
| 2002/0159636 A1 | 10/2002 | Lienhart et al. | |
| 2004/0017941 A1 | 1/2004 | Simske | |
| 2006/0274928 A1* | 12/2006 | Collins | A61B 6/00 382/132 |
| 2007/0127774 A1* | 6/2007 | Zhang | G06K 9/00771 382/103 |
| 2007/0183661 A1* | 8/2007 | El-Maleh | G06K 9/00234 382/173 |
| 2008/0100612 A1* | 5/2008 | Dastmalchi | A61B 3/102 345/418 |
| 2008/0165861 A1* | 7/2008 | Wen | H04N 19/139 375/240.26 |
| 2010/0183225 A1 | 7/2010 | Vantaram et al. | |
| 2010/0256561 A1 | 10/2010 | Gillespie, Jr. et al. | |
| 2010/0259561 A1* | 10/2010 | Forutanpour | G06F 3/0216 345/660 |
| 2011/0158558 A1* | 6/2011 | Zhao | G06F 17/30256 382/305 |
| 2011/0243443 A1* | 10/2011 | Varekamp | G06T 7/11 382/173 |
| 2012/0078899 A1 | 3/2012 | Fontana et al. | |
| 2013/0208947 A1 | 8/2013 | Kang | |
| 2014/0003686 A1 | 1/2014 | Fontanarosa | |
| 2014/0028842 A1 | 1/2014 | Abramson et al. | |
| 2014/0126821 A1 | 5/2014 | Criminisi et al. | |
| 2015/0222859 A1 | 8/2015 | Schweid et al. | |
| 2015/0334398 A1 | 11/2015 | Socek et al. | |
| 2016/0125249 A1 | 5/2016 | Mei et al. | |
| 2016/0328856 A1 | 11/2016 | Mannino et al. | |
| 2017/0236288 A1 | 8/2017 | Sundaresan et al. | |

FOREIGN PATENT DOCUMENTS

| | | |
|---|---|---|
| CN | 102687140 A | 9/2012 |
| CN | 102999924 A | 3/2013 |
| CN | 103366359 A | 10/2013 |
| JP | 2004362381 A | 12/2004 |
| JP | 2010271987 A | 12/2010 |
| JP | 2013058158 A | 3/2013 |
| JP | 2013257843 A | 12/2013 |
| WO | 2013144418 A1 | 10/2013 |
| WO | 2016029399 A1 | 3/2016 |

OTHER PUBLICATIONS

Heuer J., et al., "Global Motion Estimation in Image Sequences Using Robust Motion Vector Field Segmentation", Proceedings / ACM Multimedia 99 : [The 7th ACM International Multimedia Conference], Orlando, Florida, Oct. 30-Nov. 5, 1999, ACM, New York, NY, Oct. 30, 1999 (Oct. 30, 1999), XP058241041, pp. 261-264.

International Search Report and Written Opinion—PCT/US2016/063128—ISA/EPO—dated Apr. 3, 2017.

Liu F., et al., "Video Retargeting: Automating Pan and Scan", ACM Multimedia 2006 & Co-Located Workshops: Oct. 23-27, 2006, Santa Barbara, Califoirnia, USA, MM 06, Proceedings, ACM Press, [New York, NY], Oct. 23, 2006 (Oct. 23, 2006), XP002605061, pp. 241-250.

Trichet R., et al., "Fast Video Object Selection for Interactive Television", Proceedings / 2006 IEEE International Conference on Multimedia and Expo, ICME 2006: Jul. 9-12, 2006, Hilton, Toronto, Ontario, Canada, IEEE Service Center, Piscataway, NJ, Jul. 9, 2006 (Jul. 9, 2006), XP032964911, pp. 989-992.

Abou-Elailah A., "Fusion of Global and Local Motion Estimation Using Foreground Objects for Distributed Video Coding", IEEE, 2015, pp. 973-987.

Hamzaoui A., et al., "Object-Based Visual Query Suggestion," Multimed Tools Appl, 2014, vol. 68, pp. 429-454.

International Search Report and Written Opinion—PCT/CN2014/085381—ISA/EPO—dated Apr. 29, 2015.

Tinghuai W., et al., "TouchCut: Fast Image and Video Segmentation using Single-Touch Interaction," Computer Vision and Image Understanding, Nov. 12, 2013 (Nov. 12, 2013), vol. 120, pp. 14-30, XP028605679, ISSN: 1077-3142, DOI: 10.1016/J.CVIU.2013.10.013.

Zitnick C.L., et al., "Edge Boxes: Locating Object Proposals from Edges," Computer Vision—ECCV 2014, Lecture Notes in Computer Science, 2014, vol. 8693, pp. 391-405.

\* cited by examiner

OBJECT SELECTION BASED ON REGION OF INTEREST FUSION

I. FIELD

The present disclosure is generally related to object selection.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Object selection is associated with various computer vision (CV) use cases, and various types of inputs may be associated with initial object selection. To illustrate, for example CV use cases such as object tracking, object recognition, or augmented reality, a user may perform an initial selection of the object. However, object selection may be cumbersome in some cases, as the object may be defined by a two-dimensional mask or by a bounding box. As an illustrative example, on a touch screen of mobile communication device, this selection may be performed by "drawing" the bounding box on the touch screen. That is, the user may use a two-finger or a one-finger "draw" to cross the object by drawing a line that defines the bounding box, which may be unintuitive and imprecise. This method of object selection process may be more difficult for small objects or moving objects.

III. SUMMARY

The present disclosure describes an object selection scheme that may be used in various applications, including object tracking, object recognition, reality augmentation, and scene analysis, among other alternatives. In some cases, it may be difficult for a user to define a bounding box using a multi-touch input (e.g., a one-finger draw or a two-finger draw). For example, it may be difficult to define a bounding box around a moving object or around a small object using a multi-touch input. Accordingly, the present disclosure describes a method of object selection that may provide an improved user experience by generating an object bounding box responsive to a user input other than a multi-touch input (e.g., a one-touch user input).

In a particular example, a method of object selection is disclosed. The method includes receiving a user input, performing segmentation to generate multiple candidate regions of interest (ROIs), and performing ROI fusion to generate a final ROI (e.g., for a computer vision application). In some cases, the segmentation may include motion-based segmentation, color-based segmentation, or a combination thereof. Further, in some cases, the ROI fusion may include intraframe (or spatial) ROI fusion, temporal ROI fusion, or a combination thereof.

In another particular example, an apparatus for object selection is disclosed. The apparatus includes a processor, an input device to receive a user input, and a video encoder to generate a motion vector field responsive to the user input. The apparatus further includes a segmentation component executable by the processor to perform segmentation to generate multiple candidate regions of interest. The apparatus also includes a fusion component executable by the processor to perform region of interest fusion to generate a final region of interest.

In another particular example, an apparatus for object selection is disclosed. The apparatus includes means for receiving a user input and means for generating a motion vector field responsive to the user input. The apparatus further includes means for performing segmentation to generate multiple candidate regions of interest. The apparatus also includes means for performing region of interest fusion to generate a final region of interest.

In another particular example, a computer-readable storage device is disclosed. The computer-readable storage device stores instructions that are executable by a processor to perform various operations associated with a method of object selection. The operations may include receiving a user input, performing segmentation to generate multiple candidate regions of interest (ROIs), and performing ROI fusion to generate a final ROI.

One particular advantage provided by at least one of the disclosed examples is an improved user experience with respect to object selection, particularly in the context of selection of small objects or moving objects.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
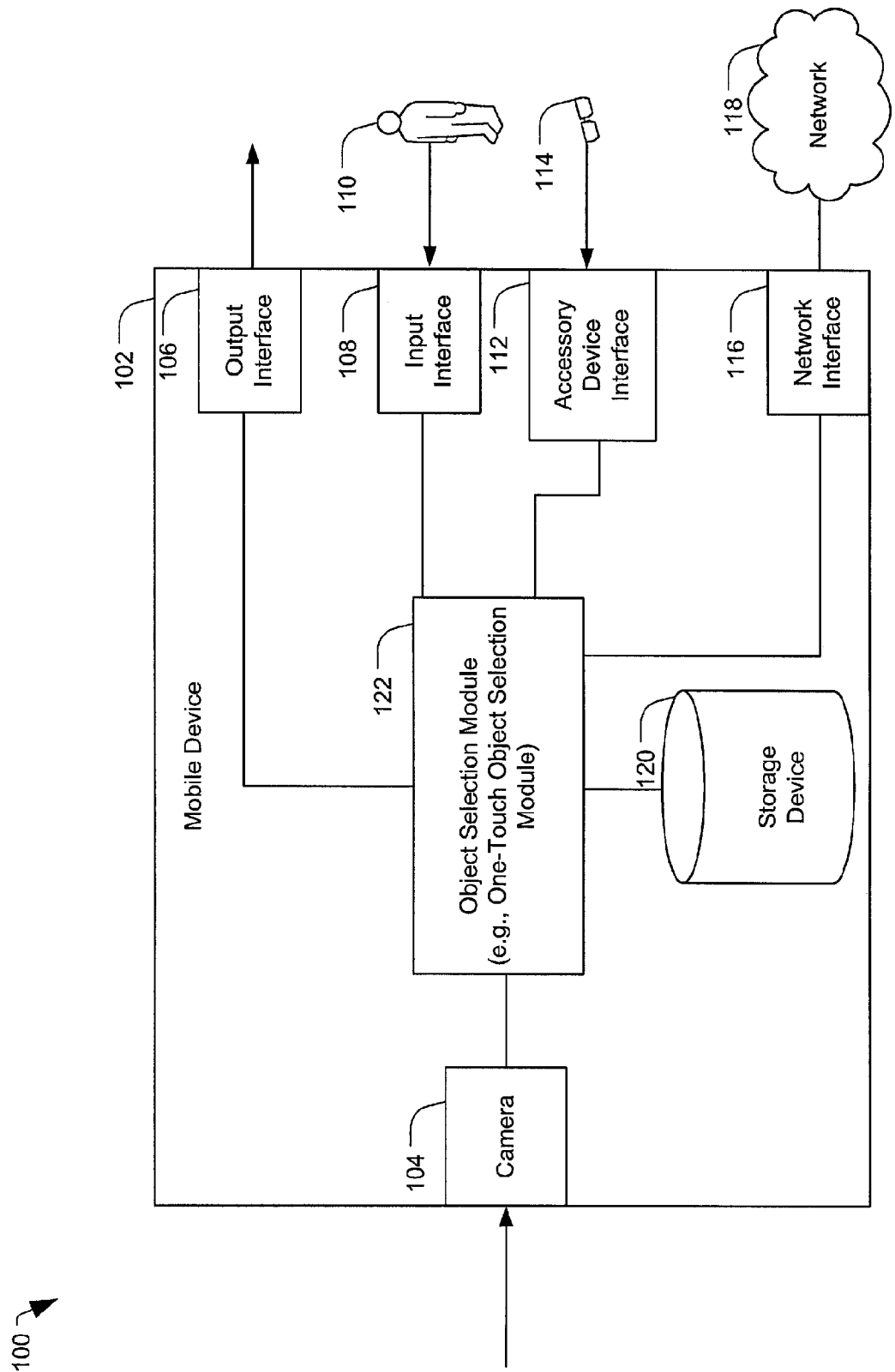
FIG. 1 is a block diagram that illustrates a particular embodiment of a system that is operable to perform one-touch object selection.

Referring to FIG. 1, a particular illustrative embodiment of a system that is operable to perform one-touch object selection is disclosed and generally designated 100. The system 100 includes a mobile device 102. The mobile device 102 may be a mobile phone, a music player, a video player, an entertainment unit, a navigation device, a communications device, a personal digital assistant (PDA), a computer, or any other mobile computing device. The mobile device 102 includes a camera 104. The camera 104 may be configured to capture and output still images and videos. The mobile device 102 includes an output interface 106. The output interface 106 may be configured to communicate with a display device, such as a liquid crystal display (LCD), a light emitting diode (LED) display, or any other display device. In a particular embodiment, the output interface 106 outputs a graphical user interface (GUI). The mobile device 102 further includes an input interface 108. The input interface 108 may include a touch screen, any other type of input device, or any combination thereof. In particular embodiments, the input interface 108 may be configured to receive input from a user 110 (e.g., input responsive to a GUI output by the output interface 106).

The mobile device 102 may further include an accessory device interface 112. In a particular embodiment, the accessory device interface 112 receives input from an accessory device 114. In a particular embodiment, the accessory device 114 includes a camera. The input received from the accessory device 114 may include image or video data. In a particular embodiment, the accessory device 114 may be embedded in a user wearable accessory, such as eyeglasses or jewelry.

The mobile device 102 may further include a network interface 116 configured to communicate with a network 118. The network interface 116 may include an Ethernet interface, an 802.11 (WiFi) interface, a Long Term Evolution (LTE) interface, a Code Division Multiple Access (CDMA) interface, a Time Division Multiple Access (TDMA) interface, an 802.16 (WiMAX) interface, any other wired or wireless network interface, or any combination thereof.

The mobile device 102 further includes a storage device 120. The storage device 120 may include a solid state drive, a hard disk drive, an optical drive, or any other type of computer readable storage medium or device. The storage device 120 may store images and videos (e.g., images and videos that are captured by the camera 104, downloaded by the mobile device 102 via the network interface 116, etc.).

An object selection module 122 (e.g., a one-touch object selection module) may be implemented in software (e.g., instructions stored in a memory of the mobile device 102 that are executable by a processor of the mobile device 102). Alternatively, all or part of the object selection module 122 may be implemented in hardware. The object selection module 122 may receive, via user input, selections of one or more objects included (e.g., depicted) in an image or a frame of video. In some embodiments, the object selection module 122 may be configured to perform object selection in response to a one-touch input received from the user 110. Examples of operation of the system 100 are further described with reference to FIGS. 2-8.

Figure 2:
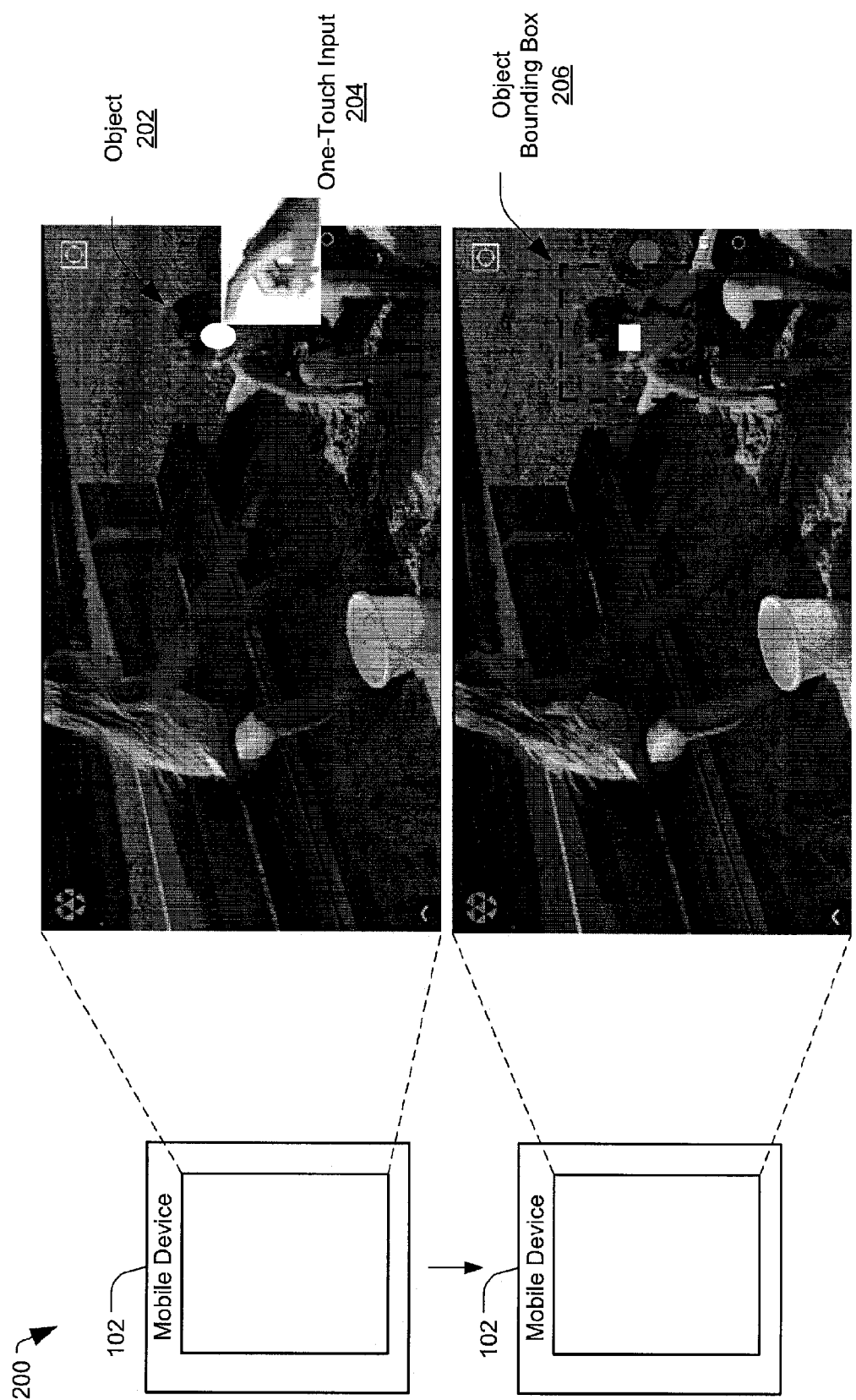
FIG. 2 is a diagram of a particular illustrative embodiment of a method of one-touch object selection.

Referring to FIG. 2, a particular illustrative embodiment of a method of one-touch object selection is disclosed and generally designated 200. FIG. 2 illustrates that a user may select an object 202 via a one-touch input 204, and an object bounding box 206 may be identified responsive to the one-touch input 204.

One-touch object selection may be useful in various computer vision (CV) applications. As an illustrative, non-limiting example, a multi-touch input to define a bounding box may be cumbersome or imprecise in an object tracking application. In order to define a bounding box using a multi-touch input, the user may cross an object by drawing a line using a one finger draw or a two finger draw. Such a bounding box may be imprecise. For example, the user may select more or less of the image for tracking than desired. Further, in some cases it may be difficult for the user to define a bounding box around a moving object (e.g., a fast moving car) or around a small object (e.g., a particular soccer player on a soccer field). Accordingly, generating the object bounding box 206 to select the object 202 in response to the one-touch input 204 may provide an improved user experience.

Figure 3:
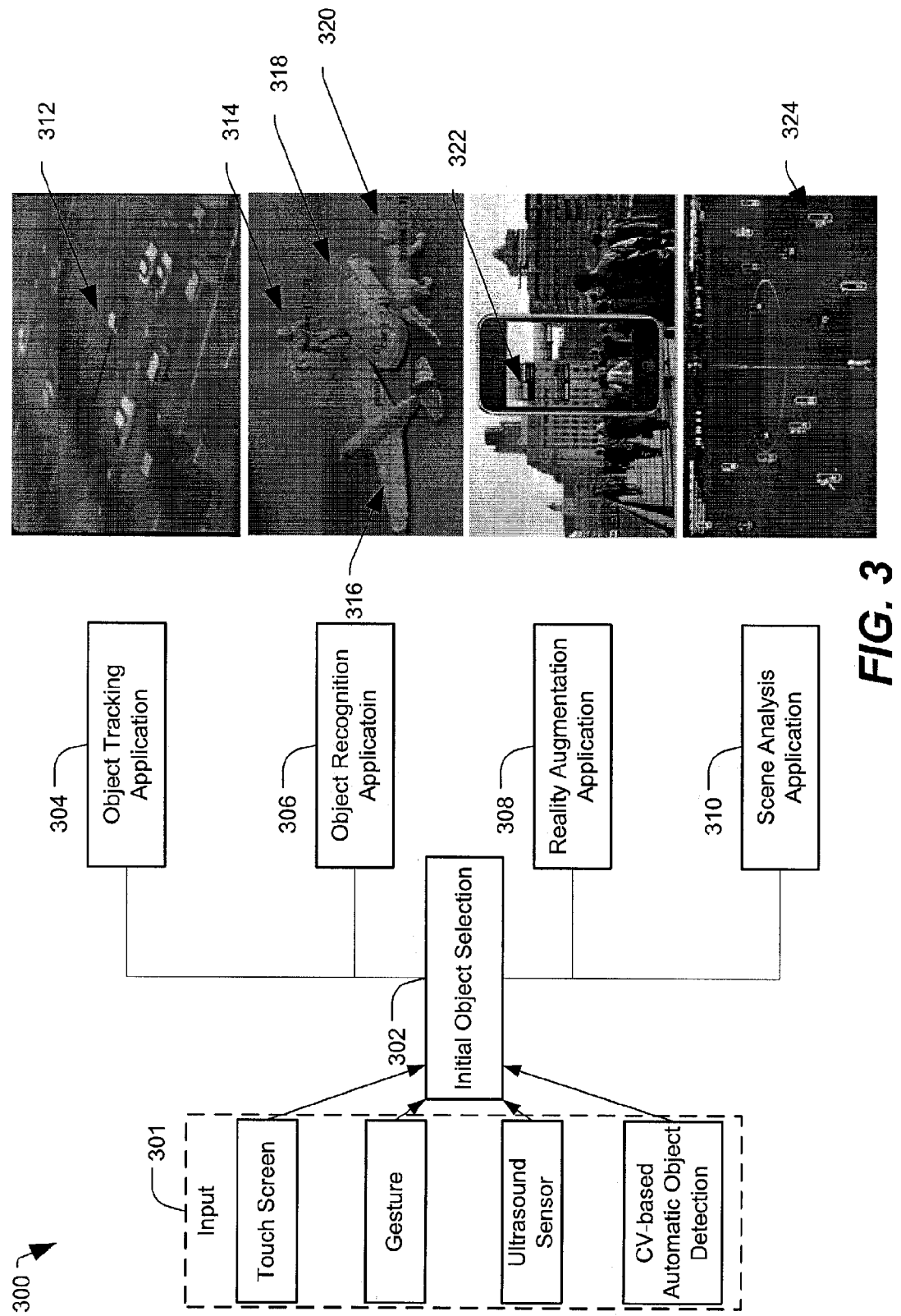
FIG. 3 is a block diagram of a particular illustrative embodiment of example computer vision (CV) applications that may utilize the results of an initial object selection.

Referring to FIG. 3, multiple example computer vision (CV) use cases associated with object selection (e.g., in response to a one-touch input) are illustrated and generally designated 300.

FIG. 3 illustrates that an initial object selection 302 may be associated with various applications. For example, the initial object selection 302 may be based on input 301. The input 301 may include user input, such as a one-touch input on a touch screen (e.g., the one-touch input 204 illustrated in FIG. 2). However, it will be appreciated that there may be multiple ways for a user to make an initial selection of an object. Examples of alternative user inputs may include one or more gestures, one or more eye movements, or ultrasound sensor input based on detection of a stylus or other device in the possession of the user. Alternatively, various CV-based automatic object detection mechanisms may be employed for initial object selection.

FIG. 3 further illustrates that the initial object selection 302 may be useful in various applications, including an object tracking application 304, an object recognition application 306, a reality augmentation application 308, or a scene analysis application 310, among other alternatives. In the example image associated with the object tracking application 304, the object being tracked includes a moving car 312. In the example image associated with the object recognition application 306, four objects are identified, including a human 314, a plane 316, a car 318, and an animal 320. In the example image associated with the reality augmentation application 308, information 322 associated with a particular location is provided (e.g., an address of a building or an indication that a monument is located near the building). In the example image associated with the scene analysis application 310, individual soccer players on a soccer field may be identified by a different bounding region 324.

Figure 4:
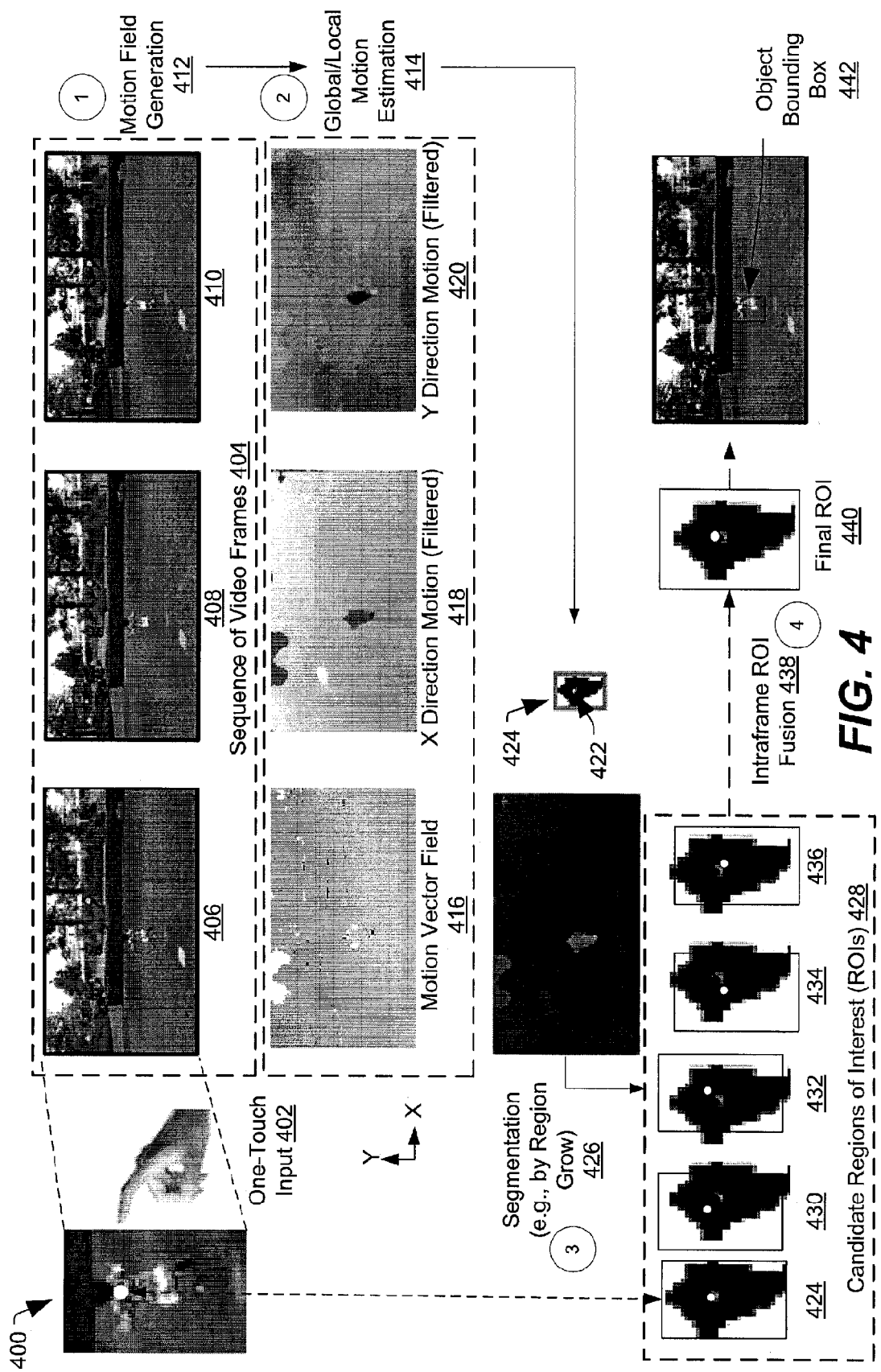
FIG. 4 is a block diagram of a particular illustrative embodiment of a method of one-touch object selection that includes motion-based segmentation to generate candidate regions of interest (ROIs) and intraframe (or spatial) ROI fusion to generate a final ROI (e.g., for an object tracking application)

Referring to FIG. 4, a particular illustrative embodiment of a method of motion-based segmentation for object selection is disclosed and generally designated 400. In the example illustrated in FIG. 4, object selection using motion-based segmentation may be responsive to a one-touch input 402 (e.g., responsive to a single user touch of a person in an image). In FIG. 4, the one-touch input 402 is represented as a white dot on the back of the running child.

Responsive to the one-touch input 402, motion may be detected based on at least two video frames. FIG. 4 illustrates an example in which a sequence of video frames 404 including a first video frame 406, a second video frame 408, and a third video frame 410 are used for motion field generation 412. However, it will be appreciated that an alternative number of video frames may be used for motion field generation 412. In some cases, a video encoder (e.g., video encoding hardware) may be used for global/local motion estimation 414. In some cases, the video encoder may estimate motion using a subset of video encoding stages associated with motion estimation without performing other video encoding stages that are not associated with motion estimation.

FIG. 4 illustrates an example of a motion vector field 416 generated by the video encoder. In some cases, the motion vector field 416 may represent a dense motion vector field (e.g., a motion vector for every 8×8 block of pixels in a frame). While the motion vector field 416 is illustrated in a grayscale format in FIG. 4, the motion vector field 416 may include one or more colors. While the motion vector field 416 may be noisy, the motion vector field 416 of FIG. 4 illustrates that a moving person is discernible. For the global/local motion estimation 414, further processing of the motion vector field 416 may be performed. For example, FIG. 4 illustrates a first grayscale image 418 that represents X direction (horizontal) motion in the motion vector field 416 and a second grayscale image 420 that represents Y direction (vertical) motion in the motion vector field 416. In the particular example illustrated in FIG. 4, the first grayscale image 418 represents the results of applying an X direction median filter to the motion vector field 416, while the second grayscale image 420 represents the results of applying a Y direction median filter to the motion vector field 416. In alternative embodiments, one or more different filters or sets of filters may be employed to further process the motion vector field 416.

In a particular embodiment, global motion estimation may include determining a median of all motion in both the X direction and the Y direction. Alternatively, other methods of global motion estimation may be employed. For example, an image may be divided into multiple regions (e.g., 8×8 pixel squares), a median of motion may be obtained for each region, and global motion may be estimated based on a median of the individual medians from the multiple regions. In a particular embodiment, local motion estimation may include determining local motion vectors in individual portions of the image (e.g., in individual 8×8 pixel squares).

In the example illustrated in FIG. 4, the one-touch input 402 may be used to separate local motion from global motion. That is, the one-touch input 402 may be associated with X and Y coordinates in the motion vector field 416, and these X and Y coordinates may represent a starting location to be used as a first seed 422 for region growing. In FIG. 4, the first seed 422 is represented by a dot, and a first region growing operation performed based on the first seed 422 results in a first region of interest (ROI) 424 (also referred to herein as a bounding box).

In some cases, a bounding box that is generated by region growing based on the one-touch input 402 may not satisfy a bounding box size threshold associated with an object tracking application (e.g., the object tracking application 304 of FIG. 3). As another example, a user may not accurately select a particular object via the one-touch input 402. For example, it may be difficult for the user to select small objects (e.g., the soccer player 324 in FIG. 2) and/or fast moving objects (e.g., the moving car 312 in FIG. 2). Accordingly, while the one-touch input 402 may provide a starting point for region growing, FIG. 4 illustrates a particular embodiment of segmentation by region growing 426 that uses one or more alternative seeds for region growing. It will be appreciated that segmentation may be performed using various methods (e.g., thresholding, grabcut, etc.) that may not use one or more seed points for segmentation.

FIG. 4 illustrates that multiple candidate regions of interest (ROIs) 428 may be generated by region growing from multiple seeds (or multiple sets of seeds). A first candidate ROI includes the first ROI 424 that is generated by region growing using the one-touch input 402 as the first seed 422. FIG. 4 further illustrates a particular example in which four other seeds are used for region growing. However, it will be appreciated that an alternative number of seeds (or sets of seeds) may be used for the segmentation by region growing 426, resulting in an alternative number of candidate ROIs. In the example of FIG. 4, the four other seeds are neighboring X,Y coordinates with respect to the X,Y coordinates of the first seed 422. In some cases, neighboring X,Y coordinates may include coordinates that are offset by n pixels (in a positive or negative direction), where n may an integer that is fixed (e.g., 1) or programmable. As an illustrative, non-limiting example, region growing based on a second seed with alternative X,Y coordinates (e.g., X−1, Y+1) may result in a second candidate ROI 430. As further examples, region growing based on a third seed with alternative coordinates (e.g., X+1, Y+1) may result in a third candidate ROI 432, region growing based on a fourth seed with alternative coordinates (e.g., X−1, Y−1) may result in a fourth candidate ROI 434, and region growing based on a fifth seed with alternative coordinates (e.g., X+1, Y−1) may result in a fifth candidate ROI 436.

FIG. 4 further illustrates that intraframe ROI fusion 438 (also referred to herein as spatial ROI fusion) may be performed on at least a subset of the candidate ROIs 428 in order to generate a final ROI 440. That is, the individual candidate ROIs 424, 430, 432, 434, and 436 represent ROIs that are generated by individual region growing operations performed based on different seeds, and the final ROI 440 represents a fused result of the individual region growing operations. In the particular example illustrated in FIG. 4, the final ROI 440 is defined by a maximum X span and a maximum Y span of the individual candidate ROIs 424, 430, 432, 434, and 436. Alternatively, one or more of the candidate ROIs 424, 430, 432, 434, and 436 may be discarded, and intraframe ROI fusion 438 may be performed on a subset of the candidate ROIs 424, 430, 432, 434, and 436. To illustrate, one or more of the five candidate ROIs 424, 430, 432, 434, and 436 may be discarded when they do not satisfy a size threshold (e.g., the ROI may be too small for object tracking). As another example, one or more of the five candidate ROIs 424, 430, 432, 434, and 436 may be discarded when they exceed a size threshold (e.g., the ROI may be too large for object tracking). That is, a candidate ROI that is identified as an outlier based on one or more criteria (e.g., similarity to other candidate ROIs) may be discarded and may not be used to determine the final ROI 440. FIG. 4 further illustrates a particular example in which the final ROI 440 that is determined by intraframe ROI fusion 438 is used as an object bounding box 442 (e.g., for object tracking). For example, the object bounding box 442 may be an initial bounding box that is used to track the child as the child runs in the scene. However, it will be appreciated that the final ROI 440 may be used for other computer vision (CV) applications (e.g., for object recognition, for reality augmentation, or scene analysis, among other alternatives).

Thus, FIG. 4 illustrates that the motion vector field 416 generated by a video encoder (e.g., video encoding hardware) may be used for segmentation and one-touch object selection. The example of one-touch object selection illustrated in FIG. 4 includes segmentation by region growing to generate multiple candidate ROIs and performing ROI fusion based on at least a subset of the candidate ROIs to determine a final ROI (e.g., for an object tracking application). While FIG. 4 illustrates a particular example that includes motion field generation 412, global/local motion estimation 414, segmentation by region grow 426, and intraframe ROI fusion 438, it will be appreciated that the order is not limiting. That is, alternative orders are possible, with more steps, fewer steps, different steps, concurrent steps, etc.

Figure 5:
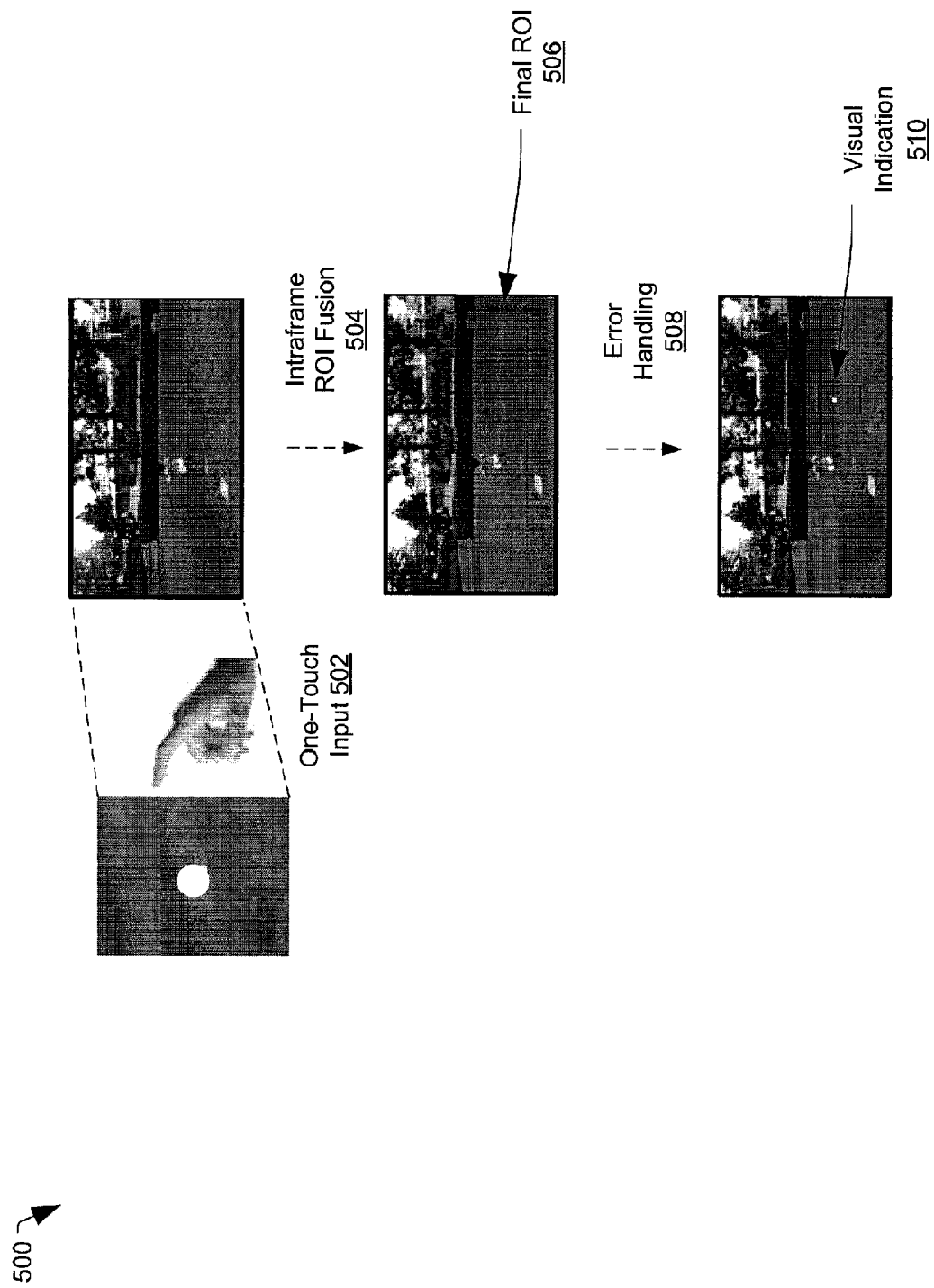
FIG. 5 is a block diagram of a particular illustrative embodiment of a method of error handling responsive to the final ROI of FIG. 4 not satisfying one or more ROI criteria.

Referring to FIG. 5, a particular illustrative embodiment of a method of error handling in the context of motion-based segmentation for object selection is disclosed and generally designated 500. In the example illustrated in FIG. 5, error handling may be responsive to a one-touch input 502 (e.g., a user touch on a portion of an image that does not include an object with associated local motion). In FIG. 5, the one-touch input 502 is represented as a white dot on a patch of grass.

FIG. 5 illustrates that performing intraframe ROI fusion 504 responsive to a user touch on the grass may result in a final ROI 506 that exceeds a size threshold (e.g., for object tracking). In the context of object tracking, the size threshold may be based on an assumption that the user would not be tracking an object as large as the size of the final ROI 506. For tracking purposes, the size threshold may specify that the object be within a particular spatial range of the one-touch input 502. To illustrate, the size threshold may specify that the object be smaller than a maximum object size and larger than a minimum object size. Additionally or alternatively, the size threshold may specify a minimum aspect ratio and a maximum aspect ratio for an object.

In the particular embodiment illustrated in FIG. 5, error handling 508 may include generating a visual indication 510. The visual indication 510 may alert a user that the one-touch user input 502 was not successful in selecting the running child. The visual indication 510 may prompt the user to provide another one-touch input. In some cases, the visual indication 510 may include a bounding box having a default size that is generated based on the X,Y coordinates of the one-touch user input 502.

Figure 6:
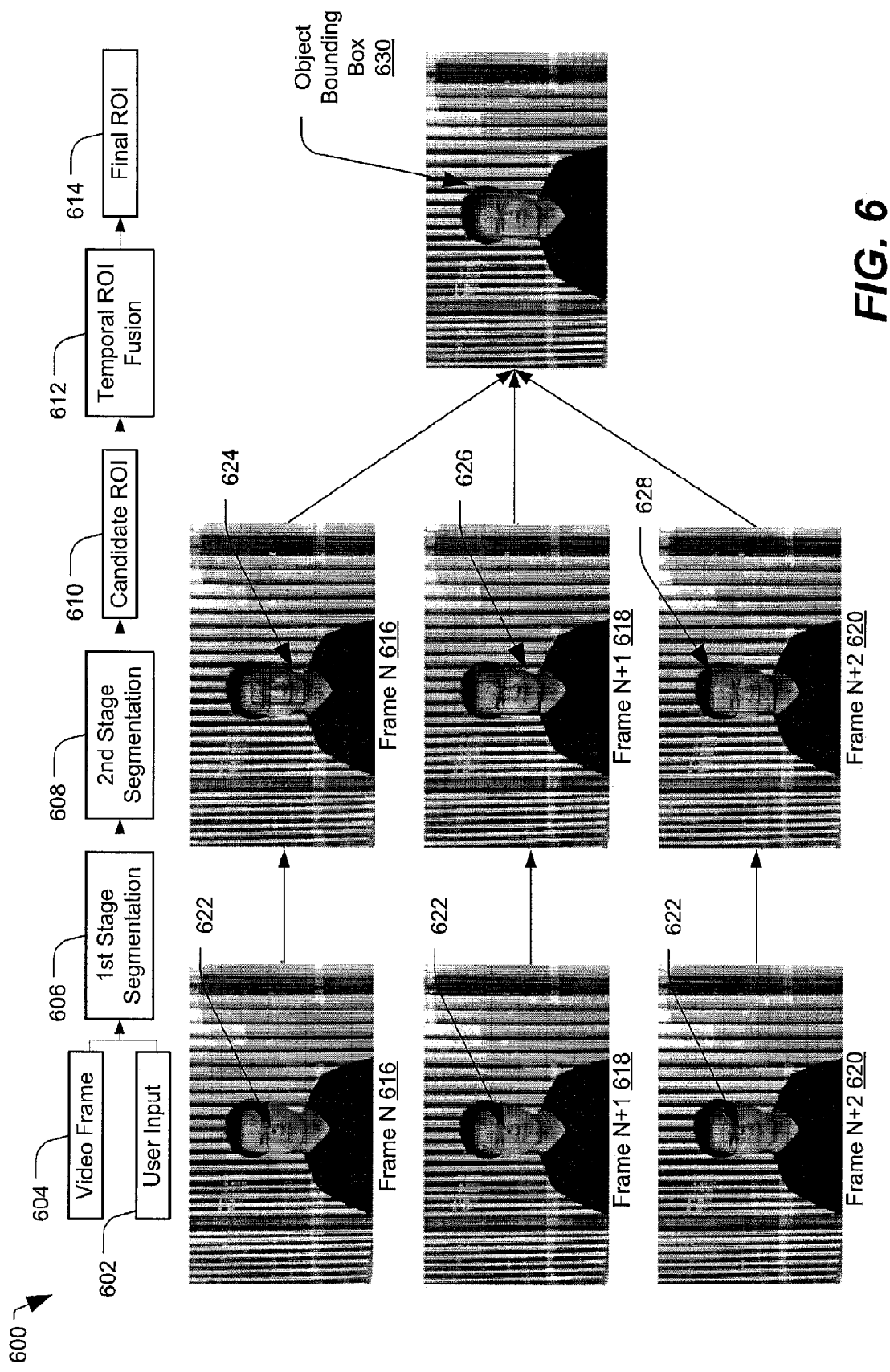
FIG. 6 is a block diagram of a particular illustrative embodiment of a method of one-touch object selection that includes color-based segmentation.

While FIGS. 4 and 5 illustrate spatial segmentation for one-touch object selection, it will be appreciated that other types of segmentation may be used instead of or in addition to spatial segmentation. Further, while FIGS. 4 and 5 illustrate intraframe or spatial ROI fusion, it will be appreciated that other types of ROI fusion may be used instead or in addition to spatial ROI fusion. For example, FIG. 6 illustrates a particular illustrative embodiment of a method of color-based segmentation that includes temporal ROI fusion for one-touch object selection and generally designated 600. FIG. 6 illustrates that two-stage segmentation may be performed for multiple video frames to generate multiple candidate ROIs, and temporal ROI fusion may be used to generate the final ROI. In some embodiments, color-based segmentation may be performed when motion-based segmentation (e.g., as described with reference to FIGS. 4-5) fails.

FIG. 6 illustrates that the output of the color-based segmentation is a bounding box (as in the motion-based segmentation method described with respect to FIGS. 4-5), and the user input 602 is a one-touch input (as in the motion-based segmentation method described with respect to FIGS. 4-5). By contrast, FIG. 6 illustrates a temporal dual-segmentation approach (e.g., a two stage segmentation approach) followed by temporal ROI fusion rather than spatial ROI fusion as described with respect to FIGS. 4-5. To illustrate, for color-based segmentation, a predetermined number of video frames may be identified for segmentation (e.g., five frames). Color-based segmentation may be performed for each of the five frames, and the method may include identifying consistent segmentation results among the five frames. That is, in the motion-based segmentation approached described for FIG. 4, the ROI fusion is done spatially, and in the particular example of color-based segmentation illustrated in FIG. 6, the ROI fusion may be done temporally.

In FIG. 6, a user input 602 may include a one-touch input. In response to the user input 602, a two-stage segmentation may be performed for multiple video frames. That is, processing of a particular video frame 604 may include a first stage segmentation 606 and a second stage segmentation 608, resulting in a candidate ROI 610 associated with the particular video frame 604. Multiple candidate ROIs may be generated, each associated with a particular video frame of the multiple video frames. In order to identify consistent segmentation results among the multiple video frames, temporal ROI fusion 612 may be performed to generate a final ROI 614.

For illustrative purposes only, FIG. 6 shows a first video frame 616 ("Frame N"), a second video frame 618 ("Frame N+1"), and a third video frame 620 ("Frame N+2"). However, it will be appreciated that color-based segmentation may be performed for an alternative number of frames. In FIG. 6, a user touch location 622 is shown in the first video frame 616. Due to camera motion or motion of objects in the scene, objects may move from frame to frame. FIG. 6 illustrates that the user touch location 622 may be propagated to subsequent frames. To illustrate, in the example of FIG. 6, the user touch location 622 is on the tip of the nose, and this point on the tip of the nose may be propagated from the first video frame 616 to the second video frame 618. Further, the user touch location 622 on the tip of the nose may be propagated from the second video frame 618 to the third video frame 620. In some cases, a motion vector field that is generated by a video encoder (as described above with respect to the motion vector field 416) may be used to propagate the user touch location 622 between frames.

For the first video frame 616, the user touch location 622 may be used to determine a starting region (e.g., a 5×5 box), and region growing may be used to grow the starting region into a mask. In some cases, if the mask fails to satisfy a size threshold (e.g., the mask is too large), region growing may be performed again using a larger starting region (e.g., a 7×7 box or a 9×9 box). In the color-based segmentation approach, region growing may be applied to red, green, and blue (RGB) color channel information, rather than X,Y coordinates (as in the motion-based approach of FIG. 4). Based on the mask, a first candidate ROI 624 may be generated.

FIG. 6 illustrates an example of segmentation using a seeded region grow method. That is, the user provides a seed in the form of a single touch point (i.e., the user touch location 622). In FIG. 6, a dual layer (also referred to herein as dual-stage) approach includes a first layer starting from a 5×5 box centered on the user touch location 622 that is grown into a region with area N (illustrated as the first stage segmentation 606). In some cases, the area N may not satisfy a size threshold (e.g., the area N may be too small). Accordingly, a second layer starting from a box (centered on the user touch location 622) having a different size (e.g., an M×M box with M greater than 5 in this case) may be grown into a region with area R (illustrated as the second stage segmentation 608). In some cases, M may be determined based on N and may be proportional with N. In a particular embodiment, a maximum size may be determined based on (⅓)frameHeight*(⅓)frameWidth, while a minimum size may be 16×16 pixels (among other alternative sizes). Further, in some cases, there may be a maximum aspect ratio and a minimum aspect ratio threshold. To illustrate, the aspect ratio thresholds may exclude tall, thin boxes or flat, narrow boxes.

For the second video frame 618, the propagated user touch location 622 may determine another starting box (e.g., a 5×5 box), region growing using RGB color channel information may be used to grow the starting box into a mask, and a second candidate ROI 626 may be generated from the mask. Similarly, for the third video frame 620, the propagated user touch location 622 may determine another starting box (e.g., a 5×5 box), region growing using RGB color channel information may be used to grow the starting box into a mask, and a third candidate ROI 628 may be generated from the mask.

The temporal ROI fusion 612 may include determining the final ROI 614 based on at least a subset of the candidate ROIs. That is, at least a subset of the first candidate ROI 624, the second candidate ROI 626, and the third candidate ROI 628 may be used to determine the final ROI 614. FIG. 6 illustrates that the final ROI 614 may be used to generate an object bounding box 630 (e.g., for object tracking).

Figure 7:
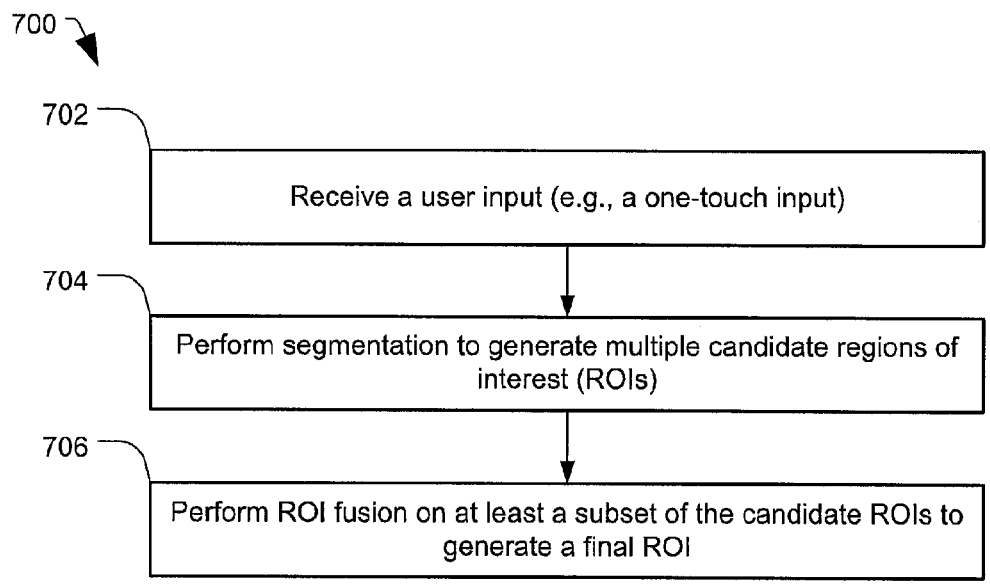
FIG. 7 is a flowchart of a particular illustrative embodiment of a method of one-touch object selection that includes color-based segmentation to generate candidate ROIs and temporal ROI fusion to generate a final ROI (e.g., for an object tracking application)

Referring to FIG. 7, a particular illustrative embodiment of a method of one-touch object selection by performing segmentation and ROI fusion is disclosed and generally designated 700. In an illustrative embodiment, the method 700 may be performed by the mobile device 102 of FIG. 1.

The method 700 includes receiving a user input (e.g., a one-touch input), at 702. For example, the user input may include the one-touch input 402 illustrated in FIG. 4 or the one-touch input 502 illustrated in FIG. 5. Alternatively, the user input may include a non-touch input, such as gesture input, ultrasound sensor input corresponding to detection of a stylus or other device operated by the user, etc.

The method 700 includes performing segmentation to generate multiple candidate regions of interest (ROIs), at 704. For example, in some cases, segmentation may include the motion-based segmentation described with respect to FIG. 4. In other cases, the segmentation may include the color-based segmentation described with respect to FIG. 6. Alternatively, the segmentation may include both motion-based segmentation and color-based segmentation. To illustrate, both motion and color information may be examined when performing the segmentation. That is, both the XY coordinate information and the RGB color channel information may be used for segmentation.

The method 700 includes performing ROI fusion on at least a subset of the candidate ROIs to generate a final ROI, at 706. For example, performing ROI fusion may include performing the intraframe ROI fusion 438 described with respect to FIG. 4. As another example, performing ROI fusion may include performing the temporal ROI fusion 612 described with respect to FIG. 6.

Figure 8:
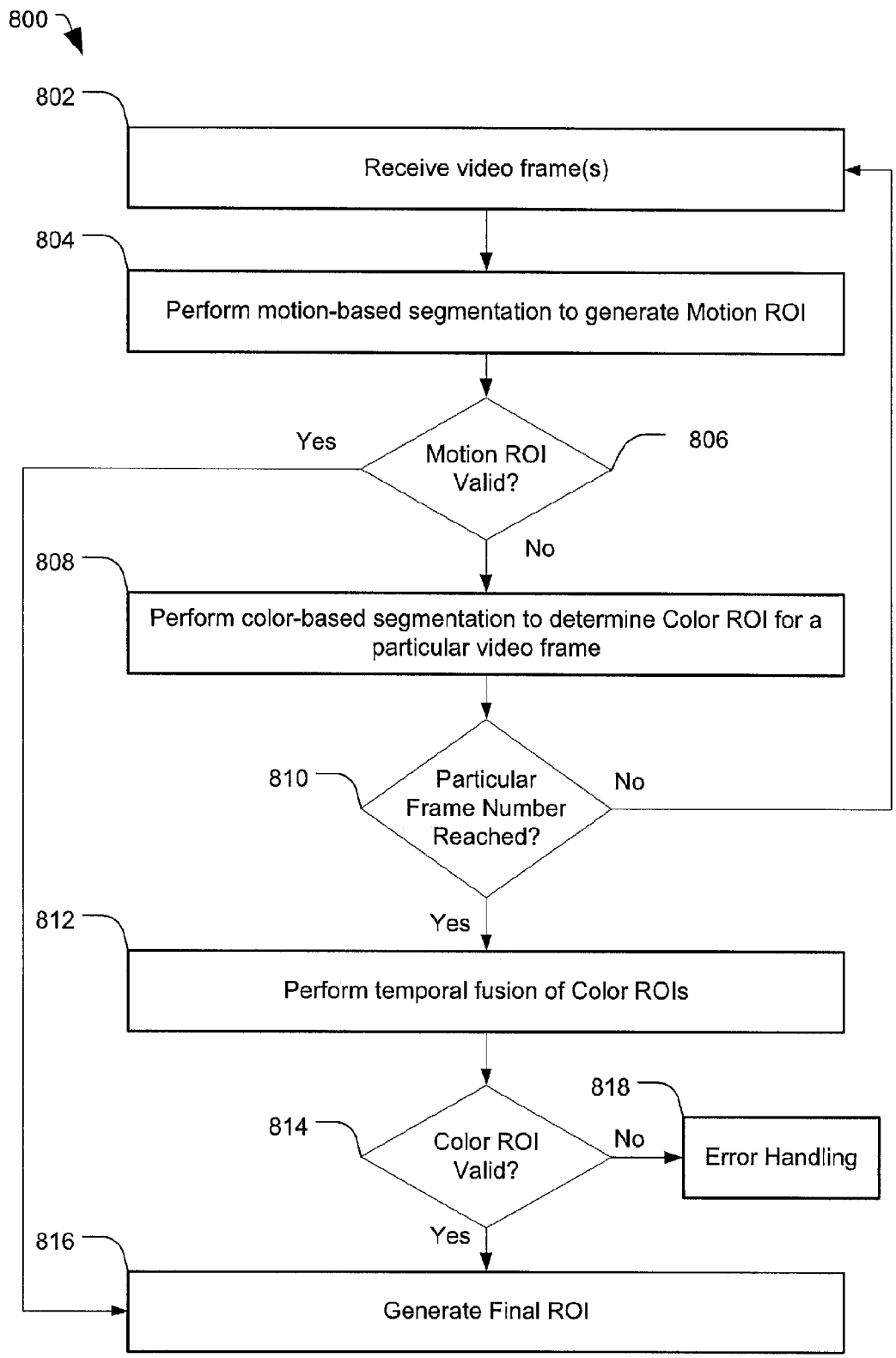
FIG. 8 is a flowchart of a particular illustrative embodiment of a method that may include both motion-based segmentation and color-based segmentation to generate a final ROI.

Referring to FIG. 8, a particular illustrative embodiment of a method of object selection using a combination of motion-based and color-based segmentation along with ROI fusion is disclosed and generally designated 800. In an illustrative embodiment, the method 800 may be performed by the mobile device 102 of FIG. 1.

The method 800 includes receiving video frame(s), at 802, and performing motion-based segmentation to determine a motion ROI, at 804. In the context of motion-based segmentation, a sequence of video frames may be received in order to estimate motion. For example, referring to FIG. 4, the sequence of video frames 404 may be received, and the motion vector field 416 may be generated by a video encoder based on the sequence of video frames 404. As illustrated in FIG. 4, the segmentation by region growing 426 may include generating multiple candidate ROIs 428 and performing intraframe (spatial) ROI fusion 440 on at least a subset of the candidate ROIs 428.

At 806, the method 800 includes determining whether the ROI generated by the intraframe ROI fusion 440 represents a valid ROI. For example, as described above with respect to FIG. 4, in some cases the ROI generated by ROI fusion may not satisfy a size threshold. For example, in the context of object tracking, the size threshold may be based on an assumption that the user would not be tracking an object as large as the ROI determined based on intraframe ROI fusion. For tracking purposes, the size threshold may specify that the object be within a particular spatial range of the one-touch input 402. To illustrate, the size threshold may specify that the object be smaller than a maximum object size and larger than a minimum object size. Additionally or alternatively, the size threshold may specify a minimum aspect ratio and a maximum aspect ratio for an object.

When the motion ROI is valid, the method 800 may include generating a final ROI, at 816. That is, in the particular embodiment illustrated in FIG. 8, the fused ROI generated using the motion-based segmentation approach may be considered a higher priority or sufficient result, and the method 800 may not include performing color-based segmentation. In some cases, an object bounding box may be generated based on the final ROI. To illustrate, referring to FIG. 4, the object bounding box 442 may be generated based on the final ROI 440.

When the motion ROI is determined to be invalid at 806, the method 800 may include performing color-based segmentation to determine a color ROI for a particular video frame, at 808. That is, in the particular embodiment illustrated in FIG. 8, color-based segmentation may be performed when motion-based segmentation fails. To illustrate, referring to FIG. 6, color-based segmentation may be performed on the first video frame 616. For the first video frame 616, the user touch location 622 may be used to determine a starting region (e.g., a 5×5 box), and region growing may be used to grow the starting region into a mask. In some cases, if the mask is too large, region growing may be performed again using a larger starting region (e.g., a 7×7 box or a 9×9 box). In the color-based segmentation approach, region growing may be applied to red, green, and blue (RGB) color channel information, rather than X,Y coordinates (as in the motion-based segmentation approach of FIG. 4). Based on the mask, a first candidate ROI 624 may be generated.

The method 800 includes determining whether a particular (e.g., a maximum) frame number has been reached, at 810. That is, color-based segmentation may be performed for a particular number of frames (e.g., five frames), and the method 800 may return to 802 to receive information associated with another frame until the particular number of frames for color-based segmentation has been reached or until the motion ROI is valid. To illustrate, referring to the example of FIG. 6, three frames are illustrated. After performing the color-based segmentation on the first video frame 616 to determine the first candidate ROI 624, color-based segmentation may be performed on the second video frame 618 to determine the second candidate ROI 626. After performing the color-based segmentation on the second video frame 618 to determine the second candidate ROI 626, color-based segmentation may be performed on the third video frame 620.

When the particular number of frames has been reached at 810, the method 800 includes performing temporal ROI fusion of color ROIs, at 812. To illustrate, referring to FIG. 6, the temporal ROI fusion 612 may be performed on the first candidate ROI 624, the second candidate ROI 626, and the third candidate ROI 628. At 814, the method 800 includes determining whether the fused color ROI is valid. To illustrate, referring to FIG. 6, the final ROI 614 that represents the results of the temporal ROI fusion 612 of the candidate ROIs 624, 626, and 628 may be evaluated to determine validity. When the fused color ROI is valid, the method 800 proceeds to 816, where the final ROI resulting from the color-based segmentation (e.g., the final ROI 614 in FIG. 6) is determined to be the final ROI. In some cases, an object bounding box may be generated based on the final ROI. To illustrate, referring to FIG. 6, the object bounding box 630 may be generated based on the final ROI 614.

In particular embodiments, the method 700 of FIG. 7 and the method 800 of FIG. 8 may be implemented via hardware (e.g., a field-programmable gate array (FPGA) device, an application-specific integrated circuit (ASIC), etc.) of a processing unit, such as a central processing unit (CPU), a digital signal processor (DSP), or a controller, via a firmware device, or any combination thereof. As an example, the method 700 of FIG. 7 and the method 800 of FIG. 8 can be performed by a processor that executes instructions, as described with respect to FIG. 9.

Figure 9:
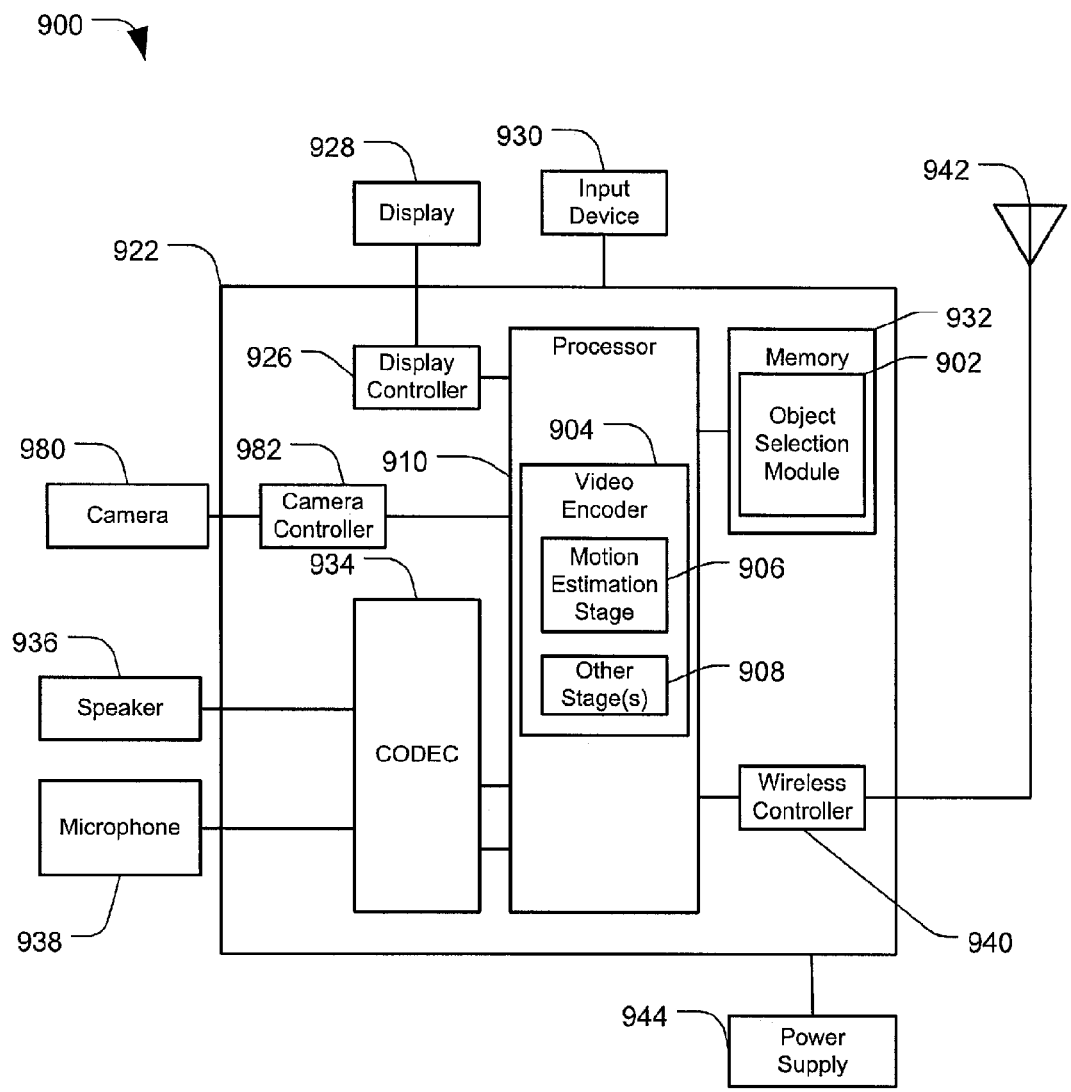
FIG. 9 is a block diagram that illustrates a particular embodiment of a wireless device configured to perform one-touch object selection.

Referring to FIG. 9, a block diagram of a particular illustrative embodiment of an electronic device including an object selection module 902 (e.g., a one-touch object selection module) is depicted and generally designated 900. The device 900 includes a processor 910, such as a central processing unit (CPU), coupled to a memory 932 and also coupled to camera controller 982. The camera controller 982 is coupled to a camera 980. In the example of FIG. 9, the object selection module 902 is shown as instructions within the memory 932, and these instructions can be executed by the processor 910 to perform all or a portion of one or more methods described herein (e.g., the method 700 of FIG. 7 and the method 800 of FIG. 8). In alternative embodiments, all or a portion of the object selection module 902 could be implemented using hardware (e.g., within the processor 910).

The processor 910 may include a video encoder 904 configured to execute a motion estimation stage 906 and one or more other stages 908. In an illustrative example, the camera 980 includes the camera 104 of FIG. 1. Alternatively, the video encoder 904 may be instructions stored in the memory 932 and executed by the processor 910. In some cases, execution of the motion estimation stage 906 may result in generation of a motion vector field (e.g., the motion vector field 416 of FIG. 4). Further, in some cases, the other stage(s) 908 may be turned off or disabled, as the other stage(s) may not be used for one-touch object selection.

FIG. 9 also shows a display controller 926 that is coupled to the processor 910 and to a display 928. The display controller 926 may correspond to the output interface 106 depicted in FIG. 1. A coder/decoder (CODEC) 934 can also be coupled to the processor 910. A speaker 936 and a microphone 938 can be coupled to the CODEC 934.

FIG. 9 also indicates that a wireless controller 940 can be coupled to the processor 910 and to an antenna 942. The wireless controller 940 may correspond to the network interface 116 depicted in FIG. 1. In a particular embodiment, the processor 910, the display controller 926, the memory 932, the CODEC 934, the wireless controller 940, and the camera controller 982 are included in a system-in-package or system-on-chip device 922. In a particular embodiment, an input device 930 and a power supply 944 are coupled to the system-on-chip device 922. The input device 930 may correspond to the input interface 108 of FIG. 1. Moreover, in a particular embodiment, as illustrated in FIG. 9, the display 928, the input device 930, the speaker 936, the microphone 938, the camera 980, the antenna 942, and the power supply 944 are external to the system-on-chip device 922. However, each of the display 928, the input device 930, the speaker 936, the microphone 938, the camera 980, the antenna 942, and the power supply 944 can be coupled to a component of the system-on-chip device 922, such as an interface or a controller.

In conjunction with the described embodiments, an apparatus is disclosed that includes means for receiving a one-touch user input. The one-touch user input may be associated with X,Y coordinates of a first image of a sequence of images. The means for receiving may include the input interface 108, the camera 104, the input device 930, the camera 980, or any combination thereof. The means for receiving may also include the input device 930 of FIG. 9, one or more other devices or circuits configured to receive data associated with the one-touch user input (e.g., a touchscreen of a mobile phone), or any combination thereof.

The apparatus further includes means for generating a motion vector field responsive to the one-touch user input. The means for generating may include the object selection module 122, the processor 910, the video encoder 904, one or more other devices or circuits configured to generate a motion vector field, or any combination thereof.

The apparatus further includes means for generating multiple candidate regions of interest (ROIs) by segmentation. The means for generating the multiple candidate ROIs may include the object selection module 122, the processor 910, the video encoder 904, one or more other devices or circuits configured to determine a region of interest by segmentation, or any combination thereof. The apparatus further includes means for means for generating a final ROI based on at least a subset of the candidate ROIs. The means for generating the final ROI may include the processor 910, one or more other devices or circuits configured to analyze each of the candidate ROIs generated by segmentation, or any combination thereof.

The apparatus may further include means for displaying an object bounding box associated with the final ROI. For example, the means for displaying may include the output interface 106, the display controller 926, the display 928, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   receiving user input associated with a first set of coordinates;
   in response to the user input, performing segmentation at a processor to generate multiple candidate regions of interest for a particular object, wherein generating the multiple candidate regions of interest comprises:
      generating a first candidate region of interest for the particular object using the first set of coordinates as a first seed, the first candidate region of interest grown from and including the first seed;
      generating at least two additional candidate regions of interest for the particular object using at least two corresponding sets of coordinates that neighbor the first set of coordinates as additional seeds, each additional candidate region of interest grown from and including the corresponding additional seed; and
      selectively discarding a particular candidate region from the multiple candidate regions in response to a first determination that a size of the particular candidate region exceeds a first threshold;
   performing region of interest fusion at the processor based on the multiple candidate regions of interest to generate a final region of interest; and
   in response to a second determination indicating that a size of the final region of interest does not satisfy a second threshold, displaying an indicator including a default size bounding box associated with the first set of coordinates.

2. The method of claim 1, wherein the first threshold is based on a size of the particular object.

3. The method of claim 1, wherein the user input includes a gesture.

4. The method of claim 1, wherein the user input is detected by an ultrasound sensor.

5. The method of claim 1, wherein the user input is associated with a computer vision based automatic object detection application.

6. The method of claim 1, further comprising:
   in response to the second determination indicating that the size of the final region of interest does not exceed the second threshold, generating an object bounding box based on the final region of interest; and
   displaying the object bounding box.

7. The method of claim 6, wherein the particular object corresponds to the user input and is substantially included within the object bounding box.

8. The method of claim 1, wherein the segmentation includes motion-based segmentation of image data.

9. The method of claim 1, wherein the segmentation includes color-based segmentation of image data.

10. The method of claim 1, wherein the at least two additional candidate regions include four candidate regions.

11. The method of claim 1, wherein the segmentation includes:
    receiving multiple video frames;
    performing motion-based segmentation based on the multiple video frames to generate a first motion region of interest;
    determining whether the first motion region of interest satisfies the first threshold; and
    in response to determining that the first motion region of interest fails to satisfy the first threshold, performing color-based segmentation on a first video frame of the multiple video frames to determine a first color region of interest.

12. The method of claim 11, further comprising generating the final region of interest based on the first motion region of interest in response to determining that the first motion region of interest satisfies the first threshold.

13. The method of claim 11, further comprising:
    performing color-based segmentation on a second video frame of the multiple video frames to determine a second color region of interest; and
    performing temporal fusion of the first color region of interest and the second color region of interest to generate a temporally fused color region of interest as the final region of interest.

14. The method of claim 1, further comprising displaying the indicator in response to the final region of interest failing to satisfy a minimum aspect ratio or a maximum aspect ratio.

15. The method of claim 1, wherein the user input includes a one-touch user input received via a touch screen.

16. An apparatus comprising:
    a processor;
    an input device configured to receive user input associated with a first set of coordinates;
    a video encoder configured to generate a motion vector field responsive to the user input;
    a segmentation component executable by the processor to perform segmentation to generate multiple candidate regions of interest for a particular object responsive to receiving the motion vector field from the video encoder, the multiple candidate regions of interest comprising:

a first candidate region of interest for the particular object, the first candidate region of interest generated using the first set of coordinates as a first seed, and the first candidate region of interest grown from and including the first seed; and at least two additional candidate regions of interest for the particular object, each additional candidate region of interest generated using a corresponding set of coordinates that neighbor the first set of coordinates as an additional seed, and each additional candidate region of interest grown from and including the corresponding additional seed, wherein a particular candidate region from the multiple candidate regions is discarded in response to a first determination that a size of the particular candidate region exceeds a first threshold;

a fusion component executable by the processor to perform region of interest fusion based on the multiple candidate regions of interest to generate a final region of interest; and an error handling component executable by the processor to, in response to a second determination indicating that a size of the final region of interest does not satisfy a second threshold, display an indicator including a default size bounding box associated with the first set of coordinates.

17. The apparatus of claim 16, wherein the video encoder is configured to generate the motion vector field based on a sequence of video frames corresponding to a video stream.

18. The apparatus of claim 16, wherein the video encoder is configured to generate the motion vector field by executing a subset of video encoding stages associated with motion estimation.

19. The apparatus of claim 18, wherein during generation of the motion vector field, the video encoder is configured to not execute a second subset of video encoding stages that are not associated with motion estimation.

20. The apparatus of claim 16, wherein the first set of coordinates comprise a first set of X,Y coordinates in the motion vector field.

21. The apparatus of claim 20, wherein a particular candidate region of additional candidate regions comprises a particular set of X,Y coordinates in the motion vector field.

22. The apparatus of claim 21, wherein the particular set of X,Y coordinates are offset by a particular number of pixels with respect to the first set of X,Y coordinates.

23. The apparatus of claim 22, wherein the particular number of pixels is an integer value that represents an offset in at least one of a positive X direction, a negative X direction, a positive Y direction, or a negative Y direction.

24. An apparatus comprising:
means for receiving a user input associated with a first set of coordinates;
means for generating a motion vector field responsive to the user input;
means for performing segmentation to generate multiple candidate regions of interest for a particular object, the multiple candidate regions of interest comprising:
a first candidate region of interest for the particular object, the first candidate region of interest generated using the first set of coordinates as a first seed, and the first candidate region of interest grown from and including the first seed; and
at least two additional candidate regions of interest for the particular object, each additional candidate region of interest generated using a corresponding set of coordinates that neighbor the first set of coordinates as an additional seed, and each additional candidate region of interest grown from and including the corresponding additional seed, wherein a particular candidate region from the multiple candidate regions is discarded in response to a first determination that a size of the particular candidate region exceeds a first threshold;

means for performing region of interest fusion based on the multiple candidate regions of interest to generate a final region of interest; and means for error handling to display an indicator including a default size bounding box associated with the first set of coordinates in response to a second determination indicating that a size of the final region of interest does not satisfy a second threshold.

25. A computer-readable storage device storing instructions that, when executed by a processor, cause the processor to perform operations comprising:
receiving a user input associated with a first set of coordinates;
in response to the user input, performing segmentation to generate multiple candidate regions of interest for a particular object, wherein generating the multiple candidate regions of interest comprises:
generating a first candidate region of interest for the particular object using the first set of coordinates as a first seed, the first candidate region of interest grown from and including the first seed;
generating at least two additional candidate regions of interest for the particular object using at least two corresponding sets of coordinates that neighbor the first set of coordinates as additional seeds, each additional candidate region of interest grown from and including the corresponding additional seed; and
selectively discarding a particular candidate region from the multiple candidate regions in response to a first determination that a size of the particular candidate region exceeds a first threshold;
performing region of interest fusion based on the multiple candidate regions of interest to generate a final region of interest; and
in response to a second determination indicating that a size of the final region of interest does not satisfy a second threshold, displaying an indicator including a default size bounding box associated with the first set of coordinates.

26. The computer-readable storage device of claim 25, wherein the operations further comprise displaying the indicator responsive to the final region of interest being smaller than a third threshold.

27. The computer-readable storage device of claim 25, wherein the operations further comprise displaying the indicator in response to the final region of interest failing to satisfy a minimum aspect ratio or a maximum aspect ratio.

28. The computer-readable storage device of claim 25, wherein the indicator prompts a user to provide a second user input.

29. The computer-readable storage device of claim 25, wherein the operations further comprise displaying an object bounding box based on the final region of interest in response to the size of the final region of interest not exceeding the second threshold.

* * * * *